United States Patent
Maruyama

(10) Patent No.: US 8,154,961 B2
(45) Date of Patent: Apr. 10, 2012

(54) OPTICAL DISK APPARATUS AND FOCUS JUMP METHOD FOR MULTILAYER OPTICAL DISK

(75) Inventor: Hideki Maruyama, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 202 days.

(21) Appl. No.: 12/578,656

(22) Filed: Oct. 14, 2009

(65) Prior Publication Data

US 2010/0118669 A1     May 13, 2010

(30) Foreign Application Priority Data

Nov. 7, 2008   (JP) ................ 2008-286796

(51) Int. Cl.
*G11B 7/00*     (2006.01)
(52) U.S. Cl. .............. 369/44.27; 369/94
(58) Field of Classification Search .......... None
See application file for complete search history.

(56) References Cited

U.S. PATENT DOCUMENTS

| | | | |
|---|---|---|---|
| 6,865,141 B2 * | 3/2005 | Tada et al. ............ | 369/44.27 |
| 7,327,642 B2 * | 2/2008 | Yamada et al. ......... | 369/44.29 |
| 2002/0145101 A1 | 10/2002 | Nishio et al. | |
| 2008/0056094 A1 | 3/2008 | Nakao et al. | |

FOREIGN PATENT DOCUMENTS

| | | | |
|---|---|---|---|
| JP | 2002157750 A | * | 5/2002 |
| JP | 2002-304746 | | 10/2002 |
| JP | 2003-016660 | | 1/2003 |
| JP | 2003-296945 | | 10/2003 |
| JP | 2007-026479 | | 2/2007 |
| JP | 2008-034058 | | 2/2008 |
| JP | 2008-123606 | | 5/2008 |

* cited by examiner

*Primary Examiner* — Thang Tran
*Assistant Examiner* — Parul Gupta
(74) *Attorney, Agent, or Firm* — Antonelli, Terry, Stout & Kraus, LLP.

(57) ABSTRACT

The present invention provides an optical disk apparatus and a focus jump method capable of reliably performing a focus jump by appropriately obtaining the amplitude of a signal such as a focus error signal in a multilayer optical disk. An optical disk includes jump areas which are provided separately from data areas and at which a focus jump is performed. When a focus jump is performed, an optical pickup is moved to the jump area, and the laser power level of the optical pickup is changed and set in accordance with a target layer to which the focus is jumped. A focus position is allowed to reach the target layer by counting the number of times of intersecting with recording layers using a reflected light from the optical disk while performing a focus sweep of an objective lens in the optical pickup.

2 Claims, 14 Drawing Sheets

FIG.9

| DISK | JUMP METHOD | EMBODIMENT | FLOW-CHART |
|---|---|---|---|
| TYPE A | JUMP TO ALL LAYERS WHILE CHANGING POWER | FIRST EMBODIMENT | FIG. 10 |
| | JUMP TO ADJACENT LAYER WITH NORMAL POWER | SECOND EMBODIMENT | FIG. 11 |
| | JUMP TO DATA AREA OF ADJACENT LAYER | THIRD EMBODIMENT | FIG. 12 |
| TYPE B | JUMP TO LAYER WITHOUT JUMP AREA WITH NORMAL POWER | FOURTH EMBODIMENT | FIG. 13 |
| | MULTISTAGE JUMP TO LAYER WITHOUT JUMP AREA | FIFTH EMBODIMENT | FIG. 14 |
| TYPE A AND TYPE B | ONE OF ABOVE METHODS IS EMPLOYED WHEN RETRYING JUMP | SIXTH EMBODIMENT | FIG. 15 |

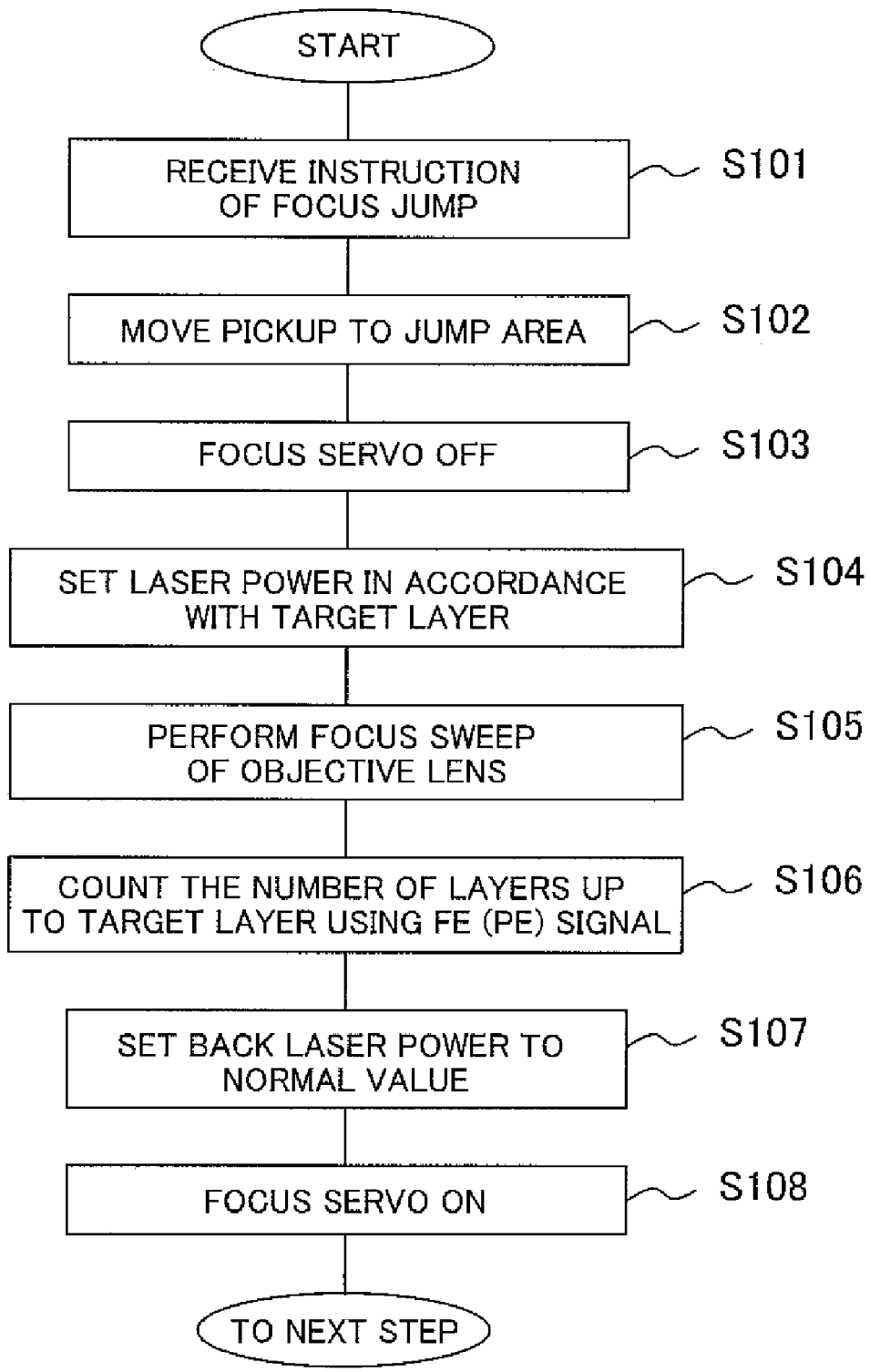

OPTICAL DISK APPARATUS AND FOCUS JUMP METHOD FOR MULTILAYER OPTICAL DISK

CLAIM OF PRIORITY

The present application claims priority from Japanese patent application serial No. JP2008-286796, filed on Nov. 7, 2008, the content of which is hereby incorporated by reference into this application.

BACKGROUND OF THE INVENTION (1) Field of the Invention

The present invention relates to an optical disk apparatus and a focus jump method for preferably performing a focus jump for a multilayer optical disk having a plurality of recording layers.

(2) Description of the Related Art

In order to increase the capacity of an optical disk, the number of recording layers has been increased. For example, four recording layers are provided in a Blu-ray disk, so that about 100 GB of information can be recorded into one disk. In a multilayer optical disk, in order to accurately move a focus position of a laser light to be irradiated into a desired recording layer, accuracy of a focus jump is required. In general focus control, a current focus position is determined by detecting a reflected light from each recording layer. However, the amplitude of the reflection signal becomes smaller where the recording layer is deeper from the disk surface, and accuracy of a jump tends to be deteriorated as the number of recording layers is increased.

As a focus jump technique in a multilayer disk, the followings have been proposed. Japanese Patent Application Laid-Open No. 2008-34058 describes that the power level of a laser light is increased at the time of performing a focus jump while correcting the aberration of the laser light by aberration correcting means, so that the amplitude of a focus error signal is optimally maintained. Japanese Patent Application Laid-Open No. 2007-26479 describes an optical recording medium in which a recording layer identifying area is provided adjacent to a data area in each recording layer, and the recording layer identifying areas are formed in such a manner that an area with a first reflectivity and an area with a second reflectivity overlap with each other along the direction where the recording layers are laminated.

SUMMARY OF THE INVENTION

The reduction of the amplitude of a reflection signal in a multilayer disk is caused by the spherical aberration of an optical pickup. However, even if spherical aberration correction is performed, it is difficult to improve the amplitude in all the recording layers. In Japanese Patent Application Laid-Open No. 2008-34058, the amplitude of a signal such as a focus error signal is secured by increasing the laser power level to be irradiated. However, there is a possibility that recorded data on the disk are erased by increasing the power level. As a result, the laser power is suppressed to a level where there is no possibility of erasing the signal. However, a sufficient signal amplitude is not always secured with such a power level in a multilayer disk having a large number of layers.

Further, Japanese Patent Application Laid-Open No. 2007-26479 describes that the recording layer to which the focus is to be adjusted is recognized by providing the recording layer identifying areas with different levels of reflectivity, and a focus jump can be performed more reliably. However, Japanese Patent Application Laid-Open No. 2007-26479 does not especially describe the strength of the laser power to be irradiated in a multilayer disk. Even if there is no possibility of erasing a signal by laser irradiation at the recording layer identifying areas, the signal amplitude is saturated when the laser power becomes excessively large. Thus, it is not preferable in identifying a recording layer.

An object of the present invention is to provide an optical disk apparatus and a focus jump method capable of reliably performing a focus jump by appropriately obtaining the amplitude of a signal such as a focus error signal in a multilayer optical disk.

According to the present invention, there is provided an optical disk apparatus for recording and reproducing data to/from a multilayer optical disk having a plurality of recording layers, the optical disk having jump areas which are provided separately from data areas and at which a focus jump is performed, the apparatus including: an optical pickup which irradiates a laser light onto the optical disk to record and reproduce data; and a signal processor which generates a recording signal supplied to the optical pickup, processes a reproducing signal from the optical pickup, and performs focus control and tracking control of the optical pickup, wherein when a focus jump to a target layer is performed, the signal processor allows the optical pickup to move to the jump area, and changes and sets the laser power level of the optical pickup in accordance with the target layer to which the focus is jumped so as to allow a focus position to reach the target layer while performing a focus sweep of an objective lens in the optical pickup.

According to the present invention, there is provided a focus jump method for a multilayer optical disk having a plurality of recording layers, the optical disk having jump areas which are provided separately from data areas and at which a focus jump is performed, the method including: moving an optical pickup for irradiating a laser light to the jump area; setting and changing the laser power level of the optical pickup in accordance with a target layer to which the focus is jumped; and allowing a focus position to reach the target layer by counting the number of times of intersecting with the recording layers using a reflected light from the optical disk while performing a focus sweep of an objective lens in the optical pickup.

In the case where the target layer to which the focus is jumped is an adjacent layer, the laser power of the optical pickup is set at a predetermined normal power level. Further, in the case where the jump area is not present on the target layer to which the focus is jumped, the laser power of the optical pickup is set at the predetermined normal power level.

According to the present invention, a laser power level is optimally set in accordance with the position of a recording layer to which the focus is jumped, and a focus jump can be reliably performed in a multilayer optical disk. Further, when a recording layer to which the focus is jumped is an adjacent layer, it is possible to efficiently perform a focus jump by switching to a simple jump step.

BRIEF DESCRIPTION OF THE DRAWINGS

These and other features, objects and advantages of the present invention will become more apparent from the following description when taken in conjunction with the accompanying drawings wherein:

FIG. 9 is a diagram for showing classification of jump methods of the respective embodiments;

FIG. 10 is a flowchart for showing procedures of a focus jump according to a first embodiment;

DETAILED DESCRIPTION OF THE EMBODIMENT

Embodiments of the present invention will be described using the drawings.

Figure 1:
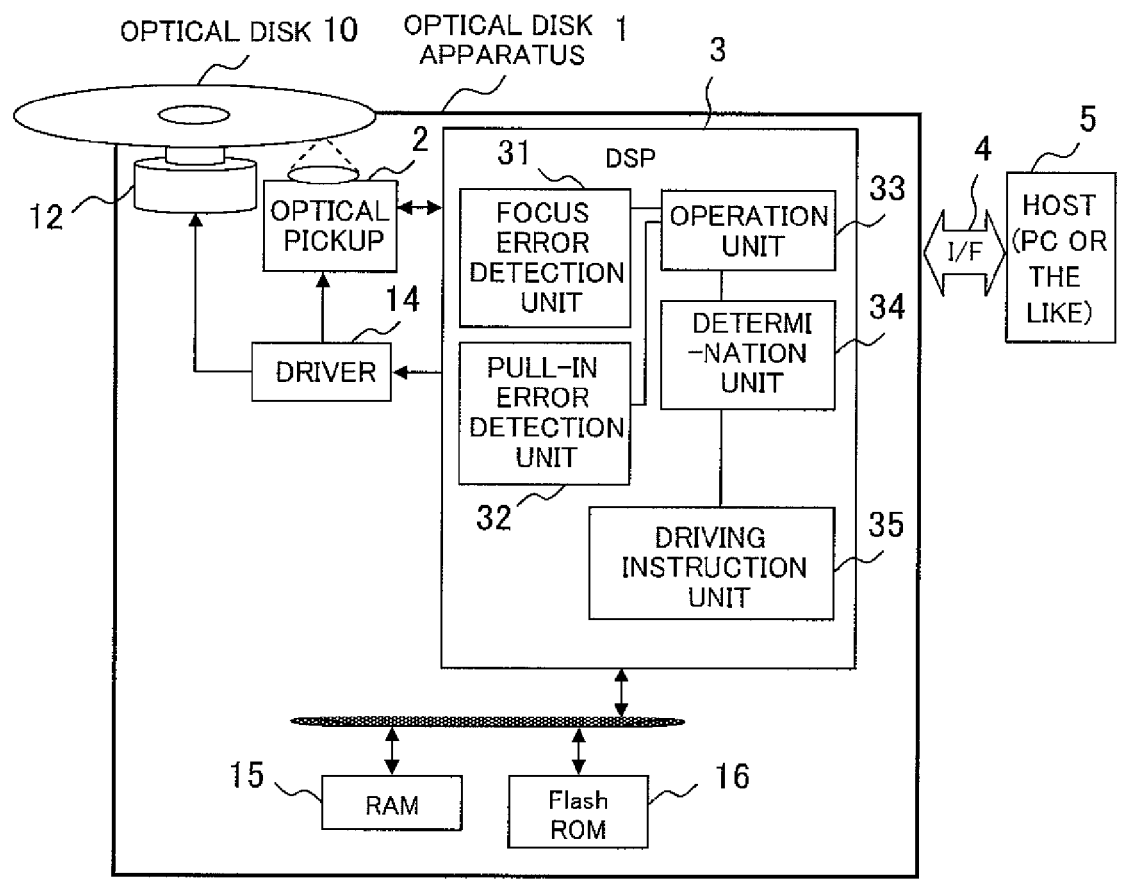
FIG. 1 is a configuration diagram for showing an embodiment of an optical disk apparatus according to the present invention.
Figure 2:
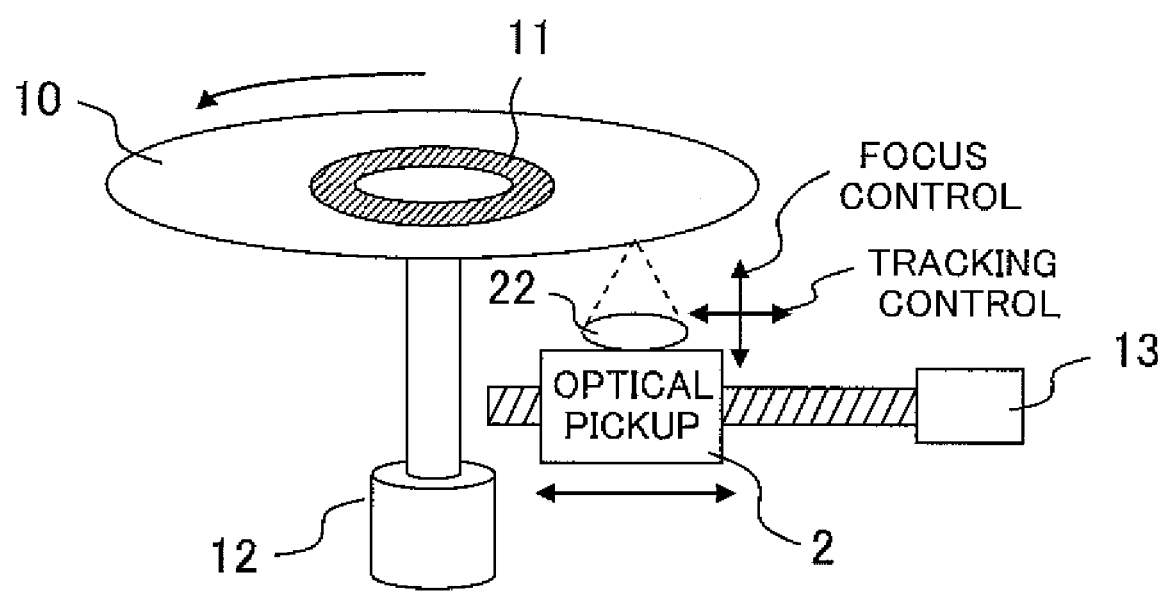
FIG. 2 is a detailed diagram of an optical pickup portion in FIG. 1.
Figure 3:
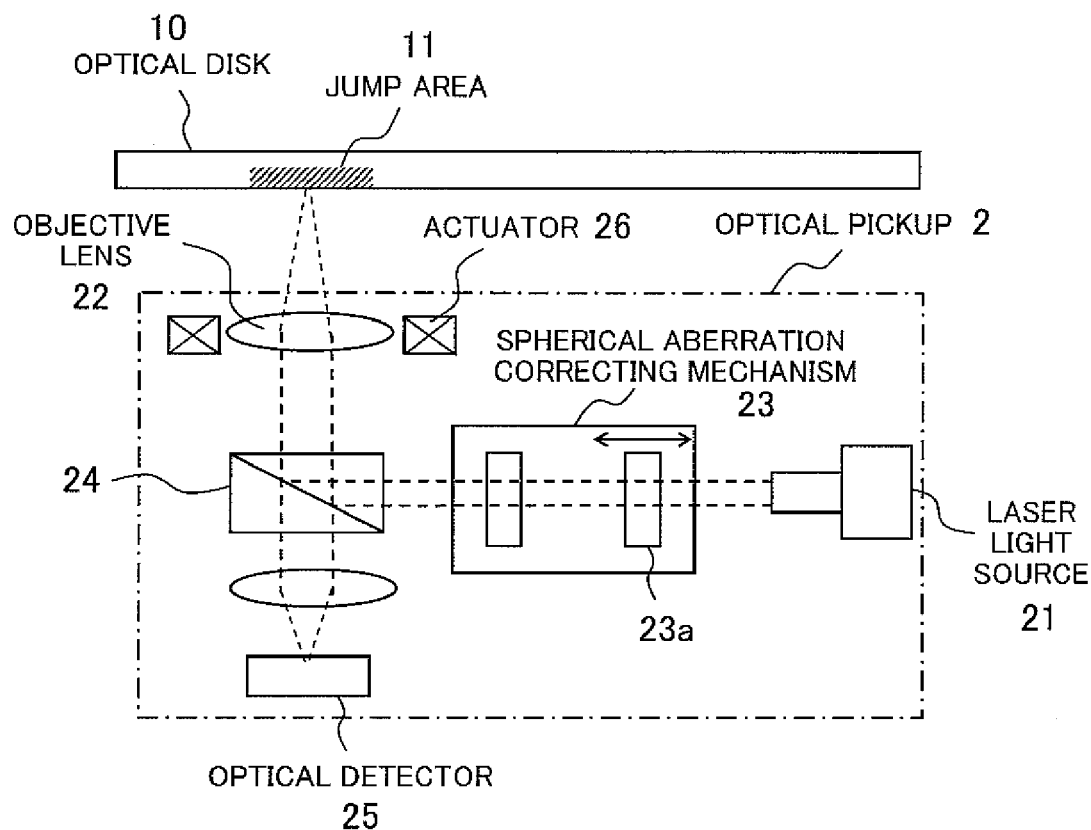
FIG. 3 is a detailed diagram of the optical pickup portion in FIG. 1.

FIGS. 1 to 3 are configuration diagrams, each showing an embodiment of an optical disk apparatus according to the present invention. FIG. 1 is a diagram showing the entire configuration of the apparatus, and FIGS. 2 and 3 are detailed diagrams, each showing an optical pickup portion.

An optical disk apparatus 1 is coupled to a host apparatus 5 for controlling the optical disk apparatus, and recording/reproducing data and commands are transferred between them via an interface 4. As the host apparatus 5, a personal computer (PC), a video camera, a recorder, or the like can be used.

In the optical disk apparatus 1, an optical disk 10 is rotated by a spindle motor 12, and a laser light is irradiated onto a desired recording layer by an optical pickup 2 to record or reproduce data. A thread motor 13 allows the optical pickup 2 to move to a predetermined position on the disk. The optical pickup 2 includes a laser light source 21 for generating a laser light, an objective lens 22 for irradiating a laser beam onto a recording layer, a spherical aberration correcting mechanism 23 for correcting the spherical aberration of the objective lens 22, a beam splitter 24 for separating an incident light into the disk and a reflected light from the disk, an optical detector 25 for detecting a reflected light from the disk to be converted into an electric signal, and an actuator 26 for driving the objective lens 22 in the thickness direction (focus direction) of the disk and the radial direction (tracking direction) of the disk. In a focus jump, the actuator 26 is driven and the objective lens 22 is moved to a jump area 11 on the disk so as to move a focus position to a desired recording layer. A driver 14 transmits a driving signal to respective mechanism systems in the apparatus such as the actuator 26 in accordance with a control signal from a signal processor (DSP) 3.

The signal processor (DSP) 3 generates a recording signal from data transferred from the host apparatus 5 to be supplied to the optical pickup 2, and reproduces data from a signal read by the optical pickup 2 to be transferred to the host apparatus 5. A RAM 15 and a flash ROM 16 store data used for executing recording/reproducing processes. Further, the DSP 3 inputs a detection signal from the optical pickup 2 to perform focus control or tracking control for the optical pickup 2 (actuator 26). A focus error detection unit 31 generates a focus error signal (FE signal), and a pull-in error detection unit 32 generates a pull-in error signal (PE signal). An operation unit analyzes the generated FE signal or PE signal, a determination unit 34 determines a current focus position, and a driving instruction unit 35 generates a control signal for focus control or tracking control. Further, the DSP 3 sets the power level of a laser light to be generated by the laser light source 21 when a focus jump operation is performed. That is, the driving instruction unit 35 sets an optimum laser power level on the basis of a target layer to which the focus is jumped and the determination result of the current focus position. Power setting conditions to be referred to at this time are stored in the flash ROM 16.

Figure 4:
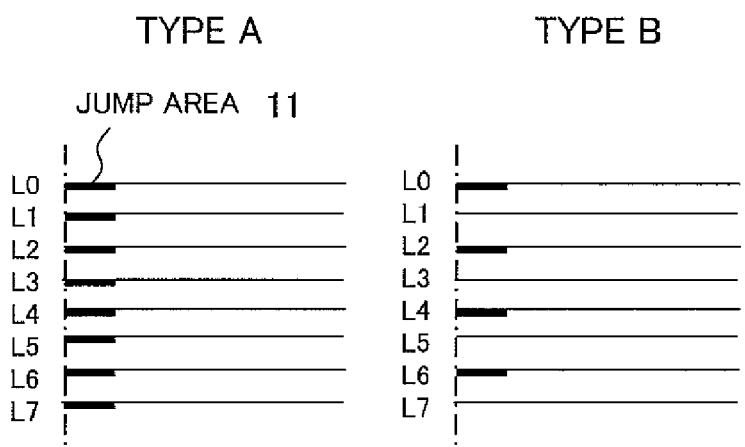
FIG. 4 is a diagram for explaining a structure of a multilayer optical disk to be used in the embodiment.

FIG. 4 is a diagram for explaining a structure of a multilayer optical disk to be used in each embodiment. It is assumed that a medium includes, for example, eight recording layers (L0 to L7). The optical disk 10 includes, at the inner circumference, the jump areas 11 which are provided separately from data areas. The jump areas 11 are portions serving as ROMs or portions with low sensitivity, and are formed as, for example, mirror surfaces. Data are not recorded into the jump areas 11. Accordingly, even when the laser power level is increased for irradiation, data are not erased. A "type A" has a structure in which the jump areas 11 are provided on the all recording layers, and is also hereinafter referred to as an "all-layer type". A "type B" has a structure in which the jump areas 11 are provided on every other layers, and is also hereinafter referred to as an "interlayer skipping type". In the "type B", the jump areas 11 may be provided on every few layers. In the case of the "type B", the number of formed jump areas 11 is decreased, so that the structure of the multilayer optical disk is simplified.

Next, operations of the respective units in the optical disk apparatus in each embodiment will be described.

Figure 5:
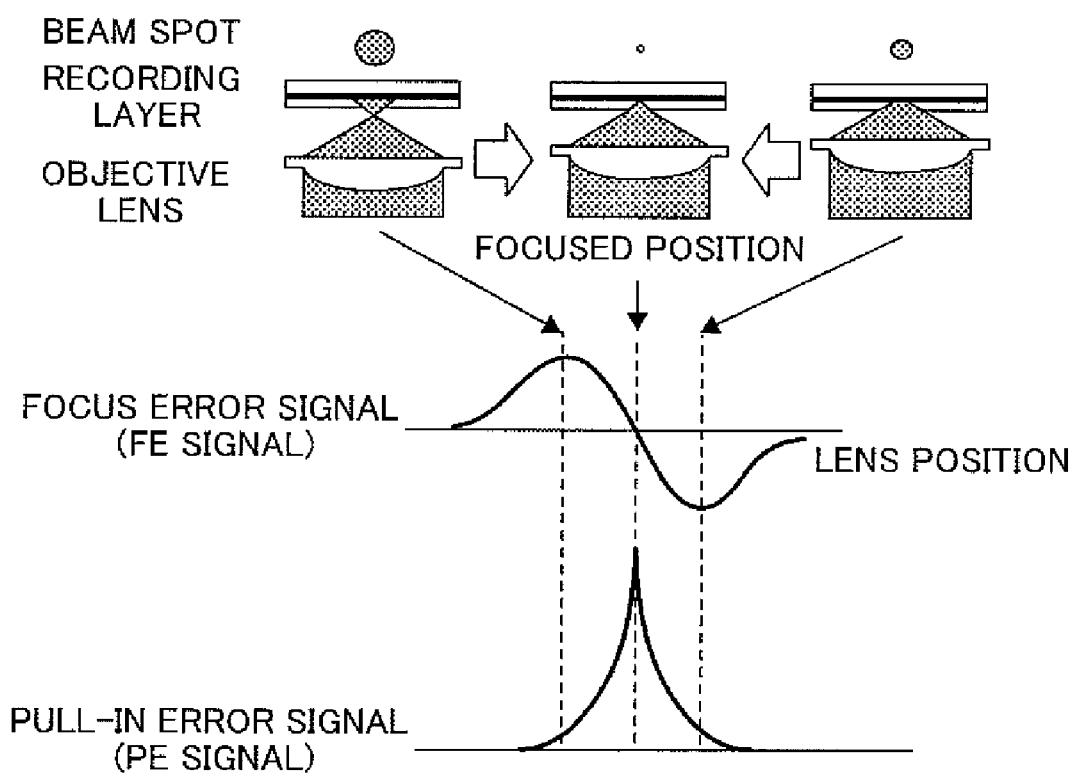
FIG. 5 is a diagram for schematically showing a focus error (FE) signal and a pull-in error (PE) signal.

FIG. 5 schematically shows the FE signal and the PE signal generated by the focus error detection unit 31 and the pull-in error detection unit 32, respectively. Each signal is generated by adding or subtracting signals from respective light receiving units obtained by dividing a light receiving surface of the optical detector 25.

The FE signal is obtained from differential outputs between the light receiving units in the diagonal direction with respect to an image of a reflected light in accordance with, for example, an astigmatic method. The level of the FE signal becomes 0 at the just-focus position (focused position), and the signal is changed in an S-like shape as the focus is deviated.

The PE signal is obtained as a summation output of signals from the respective light receiving units at a ratio of a reflected laser light to a laser light entering to the disk. The level of the PE signal is maximized at the just-focus position (focused position), and the signal is attenuated as the focus is deviated.

Figure 6:
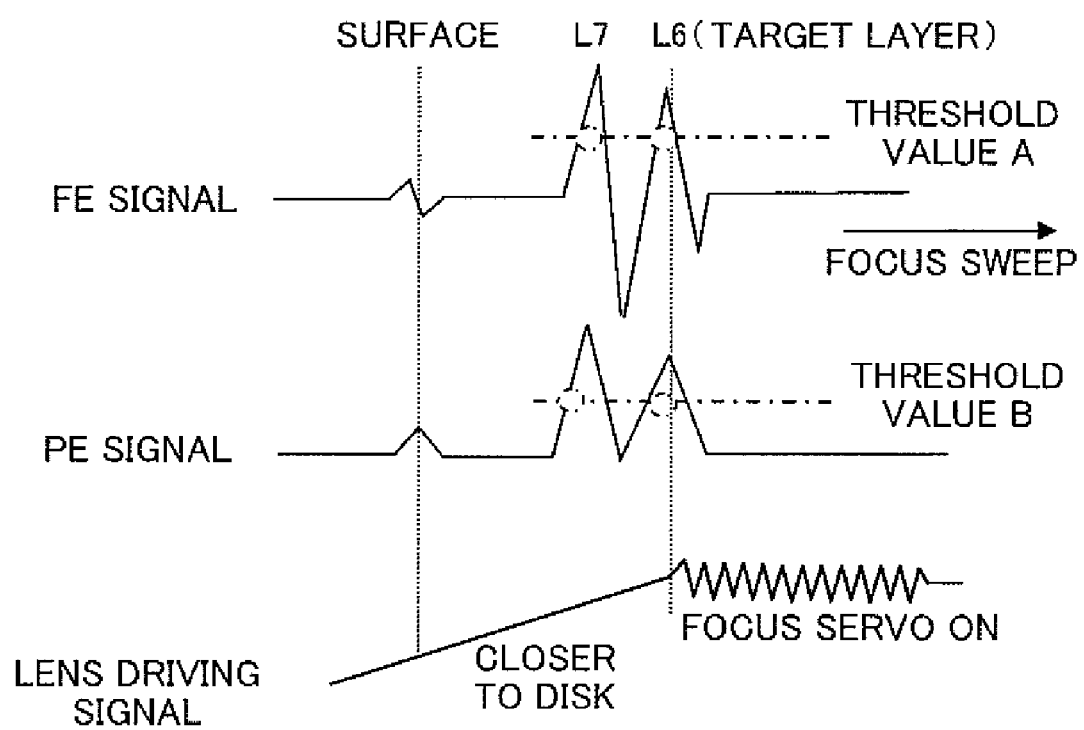
FIG. 6 is a diagram for showing a determination method of a focus jump position.

FIG. 6 is a diagram showing a determination method of a focus jump position by the operation unit 33 and the determination unit 34. The amplitude of the FE signal or the PE signal is compared to a threshold value to determine a jump position. The threshold value is stored in the ROM 16.

When the objective lens 22 is moved closer to the disk, an error signal with a small amplitude can be obtained first by reflection from a surface layer. When the objective lens 22 is moved much closer thereto, an error signal with a large amplitude can be obtained by reflection from a recording layer. The amplitude is compared to a threshold value A (or a threshold value B) to determine a current focus position using the number of times the amplitude intersects with the threshold value. For example, in the case of a jump to a layer L6, the objective lens 22 is stopped at the time the amplitude interests with the threshold value twice, and a focus servo is turned on.

FIGS. 7A to 7D are diagrams, each explaining functions of the spherical aberration correcting mechanism 23 and effects obtained by increasing the laser power level.

The objective lens 22 has a spherical aberration, so that as the depth from the disk surface to a target recording layer becomes larger, the amount of aberration becomes larger, resulting in weak strength of a reflected light. By displacing the position of a correction lens 23a, the spherical aberration correcting mechanism 23 can move the zero-aberration position in the depth direction.

Figure 7A:
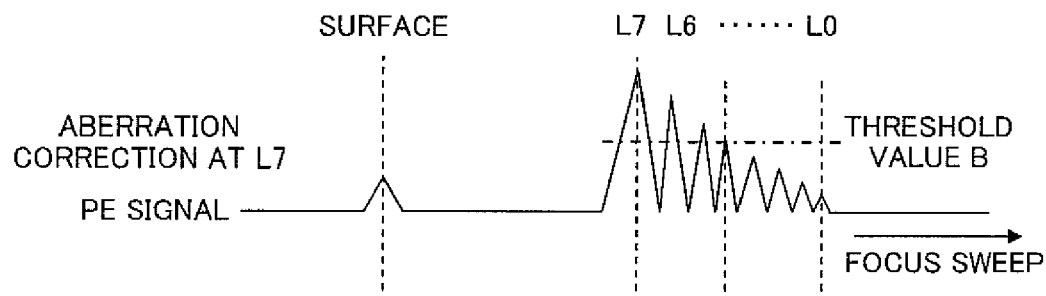
FIGS. 7A to 7D are diagrams, each explaining effects obtained by spherical aberration correction and by increasing a laser power level.

FIG. 7A shows the amplitude of the PE signal when the zero-aberration position is set at a recording layer L7 that is closest to the surface. In this case, the deeper the layer, the smaller the amplitude, resulting in less than the threshold value B.

Figure 7B:
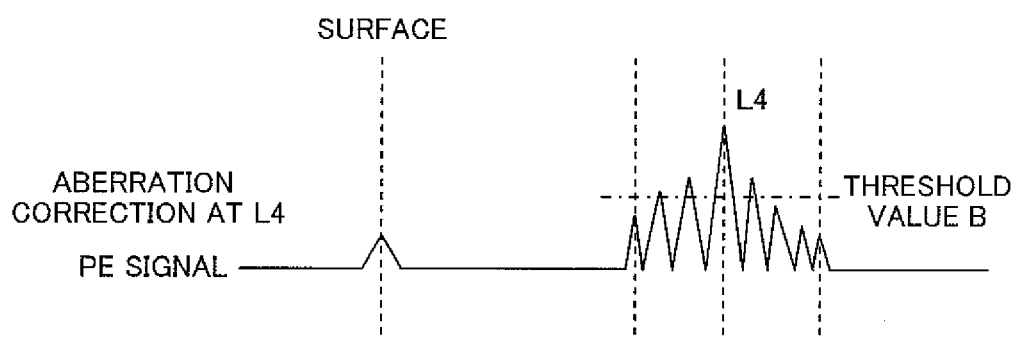

FIG. 7B shows the amplitude of the PE signal when the zero-aberration position is set at a middle recording layer L4. In this case, although the amplitude is maximized at the middle layer L4, the layers with amplitudes less than the threshold value B are present.

Figure 7C:
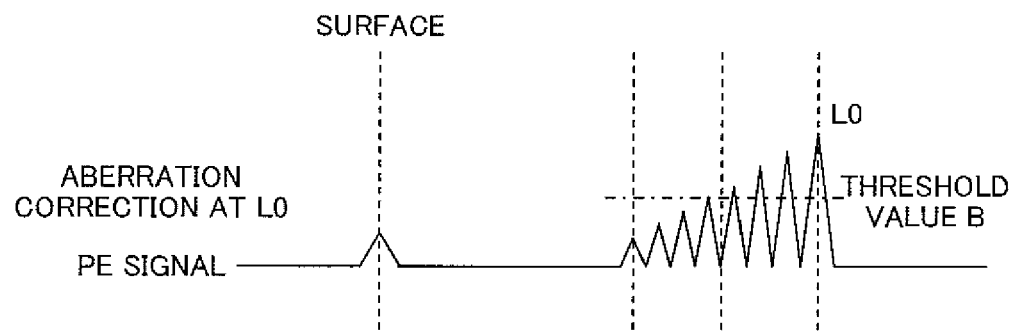

FIG. 7C shows the amplitude of the PE signal when the zero-aberration position is set at a deepest recording layer L0. In this case, although the amplitude is maximized at the recording layer L0, the amplitude becomes less than the threshold value B at shallow layers.

Figure 7D:
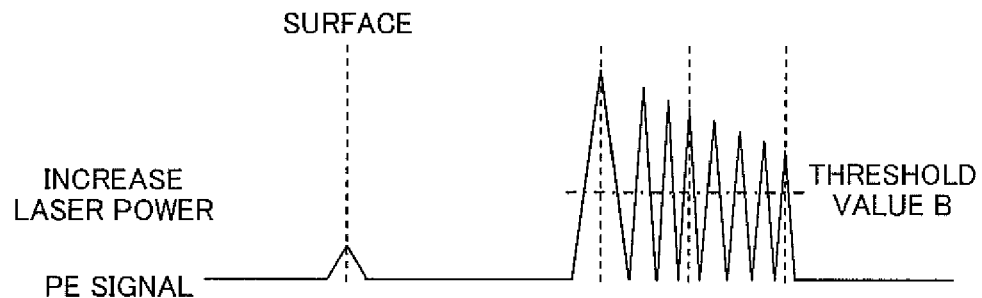

FIG. 7D shows the amplitude of the PE signal when the laser power level is increased, to be described later, in an aberration corrected state of FIG. 7A. In this case, the amplitude can be larger than the threshold value B at any layer.

As described above, by adjusting the spherical aberration correcting mechanism 23, the maximum position of the amplitude of the PE signal can be moved in the depth direction. According to the spherical aberration correcting mechanism 23, the amplitude of a recording layer adjacent to the correction position can be improved, but an amplitude larger than the threshold value cannot be obtained in a wide range of the recording layers. In the embodiments, based on increasing the laser power level, an appropriate amplitude larger than the threshold value is secured by subsidiarily using spherical aberration correction for an adjacent recording layer.

Figure 8A:
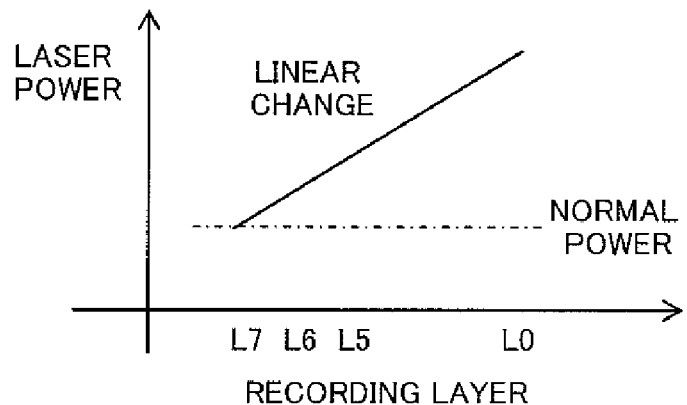
FIGS. 8A to 8C are diagrams, each explaining a laser power value set in accordance with a target layer.
Figure 8B:
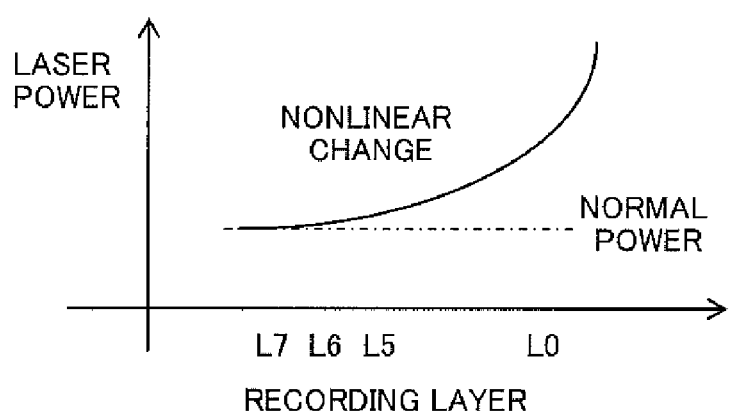
Figure 8C:
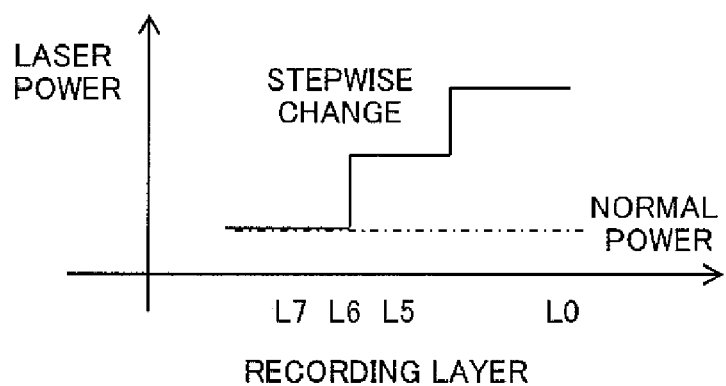

FIGS. 8A to 8C are diagrams, each explaining a laser power value set in accordance with a target layer. In the embodiments, the laser power level is changed in accordance with the position of a target layer to which the focus is jumped. As a method of changing the laser power level, three examples will be shown.

FIG. 8A shows a case in which the laser power level is linearly increased with respect to a target position, FIG. 8B shows a case in which the laser power level is nonlinearly increased in accordance with the characteristics of a medium, and FIG. 8C shows a case in which target positions are classified into zones and the laser power level is increased stepwise for each zone. When jumping from the surface to a deep recording layer, the reduction of the amplitude at a deep layer can be suppressed, as shown in FIG. 7D, by increasing the laser power level in any cases.

By utilizing the above-described elemental techniques, various kinds of focus jump methods can be realized.

FIG. 9 is a table in which jump methods of the respective embodiments, to be described later, are classified. Target optical disks are classified into the "type A" in which the jump areas are provided on all the layers and the "type B" in which the jump areas are provided on every few layers.

For disks of the type A, the following methods are provided: a basic method (first embodiment) in which the laser power level is set in accordance with FIGS. 8A to 8C on the basis of the position of a target layer; a method (second embodiment) in which a normal power is applied in the case where a target layer is an adjacent layer; and a method (third embodiment) in which a normal power is applied to a data area in the case where a target layer is an adjacent layer.

For disks of the type B, the following methods are provided: a method (fourth embodiment) in which a normal power is applied in the case where no jump area is provided on a target layer; and a multistage jump method (fifth embodiment) in which in the case where no jump area is provided on a target layer, the focus is once jumped to an adjacent layer (first-stage target layer) having the jump area while setting the power level in accordance with FIGS. 8A to 8C, and the focus is further jumped to the final target layer at a normal power level.

Further, in the case where a jump fails at the normal power level in any one of the type A and type B, there is a method (sixth embodiment) in which the focus jump is retried by any jump method of the embodiments.

First Embodiment

A first embodiment is a basic method in which the laser power level is set in accordance with FIGS. 8A to 8C on the basis of the position of a target layer in a disk of the type A having the jump areas on all the layers.

FIG. 10 is a flowchart showing procedures of a focus jump according to the first embodiment. It is assumed that the optical pickup stands by at the normal laser power level for recording or reproducing operations at a data area of one recording layer of the optical disk.

In S101, an instruction of a focus jump to another recording layer is received from the host apparatus.

In S102, the optical pickup is moved to the jump area 11.

In S103, the focus servo is turned off.

In S104, the laser power level is set in accordance with any pattern of FIGS. 8A to 8C on the basis of a target layer to which the focus is jumped.

In S105, the actuator is driven to perform a focus sweep of the objective lens 22 in the direction towards the target layer.

In S106, the number of times of intersecting with the recording layers is counted by using the FE signal (or the PE signal) obtained from a reflected light from the disk, and the focus sweep is stopped if determined that the focus reaches the target layer.

In S107, the laser power level is set back to its normal value.

In S108, the focus servo is turned on, and the focus jump operation is completed. The flow continuously proceeds to the next step in accordance with an instruction from the host apparatus.

According to the first embodiment, an appropriate laser power level is set in accordance with a target layer when performing a focus jump, so that it is possible to suppress the reduction of the amplitude of the FE signal (PE signal) and to eliminate a false operation of the focus jump. Further, the jump operation is performed at the jump area provided separately from the data area, so that if the laser power level is increased, data are not erased.

Second Embodiment

A second embodiment is a modified version of the first embodiment, and is a method in which the normal power is applied in the case where a target layer is an adjacent layer.

Figure 11:
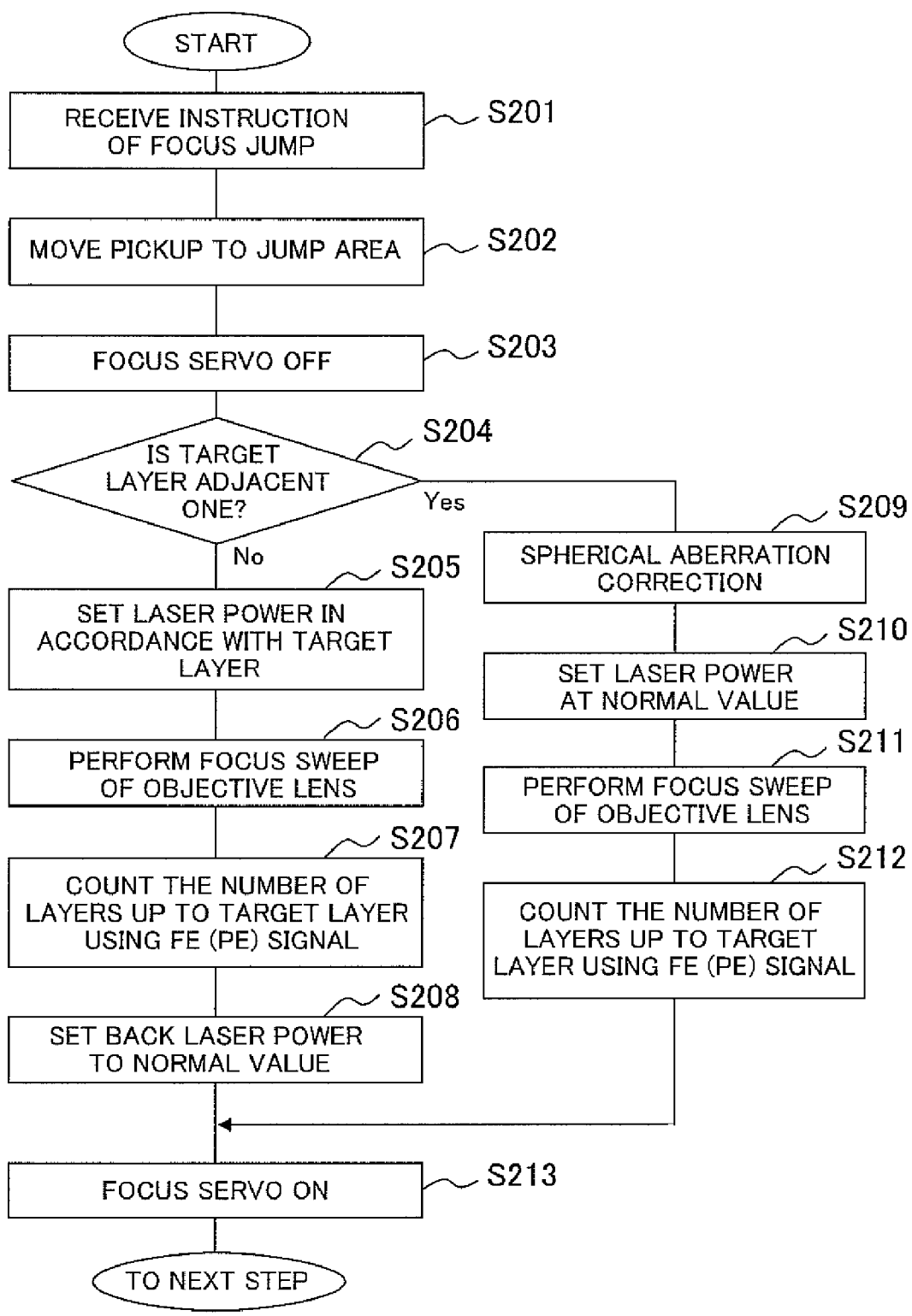
FIG. 11 is a flowchart for showing procedures of a focus jump according to a second embodiment.

FIG. 11 is a flowchart showing procedures of a focus jump according to the second embodiment.

In S201, an instruction of a focus jump to another recording layer is received from the host apparatus.

In S202, the optical pickup is moved to the jump area 11.

In S203, the focus servo is turned off.

In S204, it is determined whether or not a target layer to which the focus is jumped is an adjacent layer. If a target layer to which the focus is jumped is not an adjacent layer, the flow proceeds to S205 (No). If a target layer to which the focus is jumped is an adjacent layer, the flow proceeds to S209 (Yes).

In S205 to S208, the laser power level is set in accordance with FIGS. 8A to 8C on the basis of a target layer to perform a focus jump, as similar to S104 to S107 of the first embodiment (FIG. 10), and thus the explanations thereof will not be repeated.

In S209, the correction position is set at the adjacent layer that is the target layer by performing spherical aberration correction of the objective lens by the spherical aberration correcting mechanism 23. Accordingly, a detection signal from the adjacent layer can be increased as explained in FIGS. 7A to 7C.

In S210, the laser power level is set at the normal value. It should be noted that if the current power value is the normal value, the laser power level does not need not to be changed.

In S211, a focus sweep of the objective lens is performed in the direction towards the target layer (adjacent layer).

In S212, the number of times of intersecting with the recording layers is counted by using the FE signal (PE signal), and the focus sweep is stopped if determined that the focus reaches the target layer (adjacent layer).

In S213, the focus servo is turned on, and the focus jump operation is completed.

According to the second embodiment, in the case of a jump to an adjacent layer, the spherical aberration correction is performed without changing the laser power level, so that the process becomes easier as compared to the case in which the power level is changed for all the recording layers.

Third Embodiment

A third embodiment is a modified version of the second embodiment, and is a method in which the normal power is applied to a data area in the case where a target layer is an adjacent layer.

Figure 12:
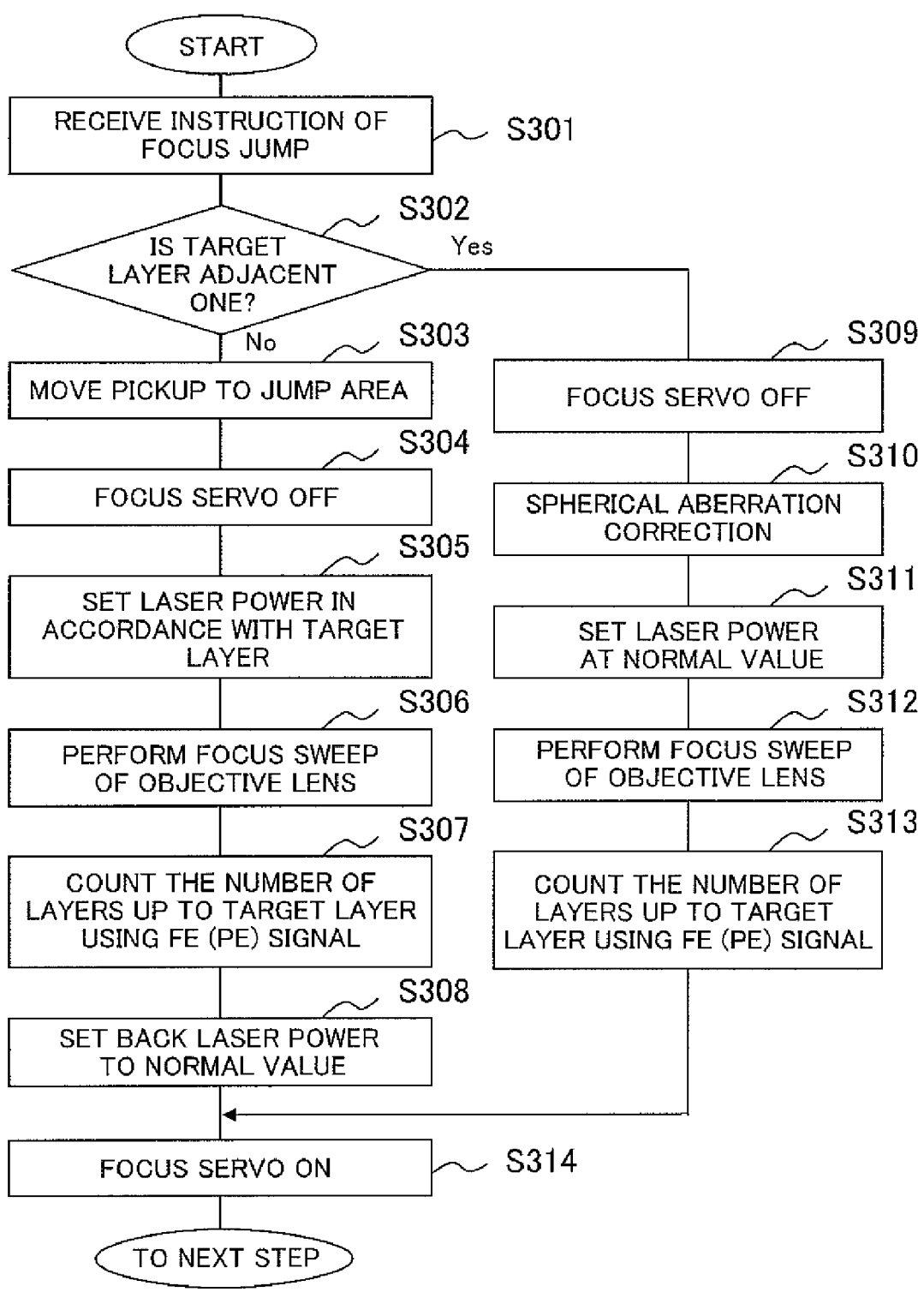
FIG. 12 is a flowchart for showing procedures of a focus jump according to a third embodiment.

FIG. 12 is a flowchart showing procedures of a focus jump according to the third embodiment.

In S301, an instruction of a focus jump to another recording layer is received from the host apparatus.

In S302, it is determined whether or not a target layer to which the focus is jumped is an adjacent layer. If a target layer to which the focus is jumped is not an adjacent layer, the flow proceeds to S303 (No). If a target layer to which the focus is jumped is an adjacent layer, the flow proceeds to S309 (Yes).

In S303, the optical pickup is moved to the jump area 11.

In S304, the focus servo is turned off.

In S305 to S308, the laser power level is set in accordance with FIGS. 8A to 8C on the basis of a target layer to perform a focus jump, as similar to S104 to S107 of the first embodiment (FIG. 10).

In S309, the focus servo is turned off, and a focus jump is performed at the current position (data area).

In S310 to S313, the spherical aberration correction of the objective lens is set at the adjacent layer that is the target layer, and a focus jump is performed at the normal laser power level, as similar to S209 to S212 of the second embodiment (FIG. 11), and thus the explanations thereof will not be repeated.

In S314, the focus servo is turned on, and the focus jump operation is completed.

According to the third embodiment, in the case of a jump to an adjacent layer, the spherical aberration correction is performed without moving to the jump area and without changing the laser power level, so that the process becomes easier as compared to the case in which the pickup is moved to the jump area. In this case, the jump operation is performed at the data area. However, there is no possibility of erasing data because the laser power level is set at the normal value.

Fourth Embodiment

A fourth embodiment is a modified version of the first embodiment and is a method in which the normal power is applied in the case where no jump area is provided on a target layer in a disk of the type B having the jump areas on every few layers.

Figure 13:
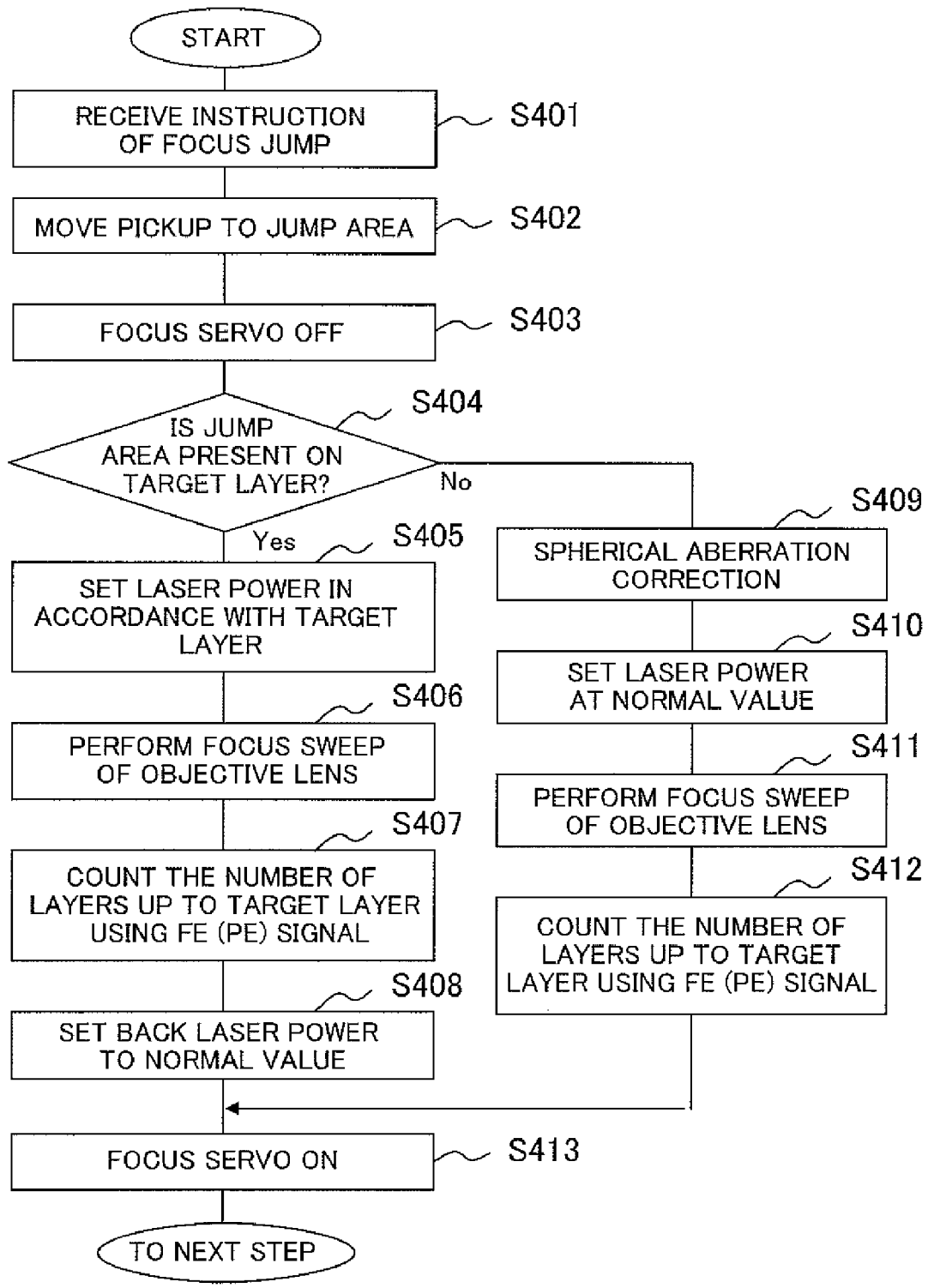
FIG. 13 is a flowchart for showing procedures of a focus jump according to a fourth embodiment.

FIG. 13 is a flowchart showing procedures of a focus jump according to the fourth embodiment.

In S401, an instruction of a focus jump to another recording layer is received from the host apparatus.

In S402, the optical pickup is moved to the jump area 11 (or the area corresponding to the jump area in the radial direction).

In S403, the focus servo is turned off.

In S404, it is determined whether or not the jump area 11 is present on a target layer to which the focus is jumped. If the jump area 11 is present, the flow proceeds to S405 (Yes). If the jump area is not present, the flow proceeds to S409 (No).

In S405 to S408, the laser power level is set in accordance with FIGS. 8A to 8C on the basis of a target layer to perform a focus jump, as similar to S104 to S107 of the first embodiment (FIG. 10).

In S409 to S412, the spherical aberration correction of the objective lens is set at the target layer, and a focus jump is performed at the normal laser power level, as similar to S209 to S212 of the second embodiment (FIG. 11).

In S413, the focus servo is turned on, and the focus jump operation is completed.

According to the fourth embodiment, in the case of a jump to a recording layer without the jump area 11 in a disk of the type B, a jump to a target layer can be performed at the normal laser power level by combining the spherical aberration correction.

Fifth Embodiment

A fifth embodiment is a modified version of the fourth embodiment, and is a multistage jump method in which in the case where no jump area is provided on a target layer, a first jump to an adjacent layer (first-stage target layer) having the jump area is performed while changing the power level, and a jump to the final target layer is further performed at the normal power level.

Figure 14:
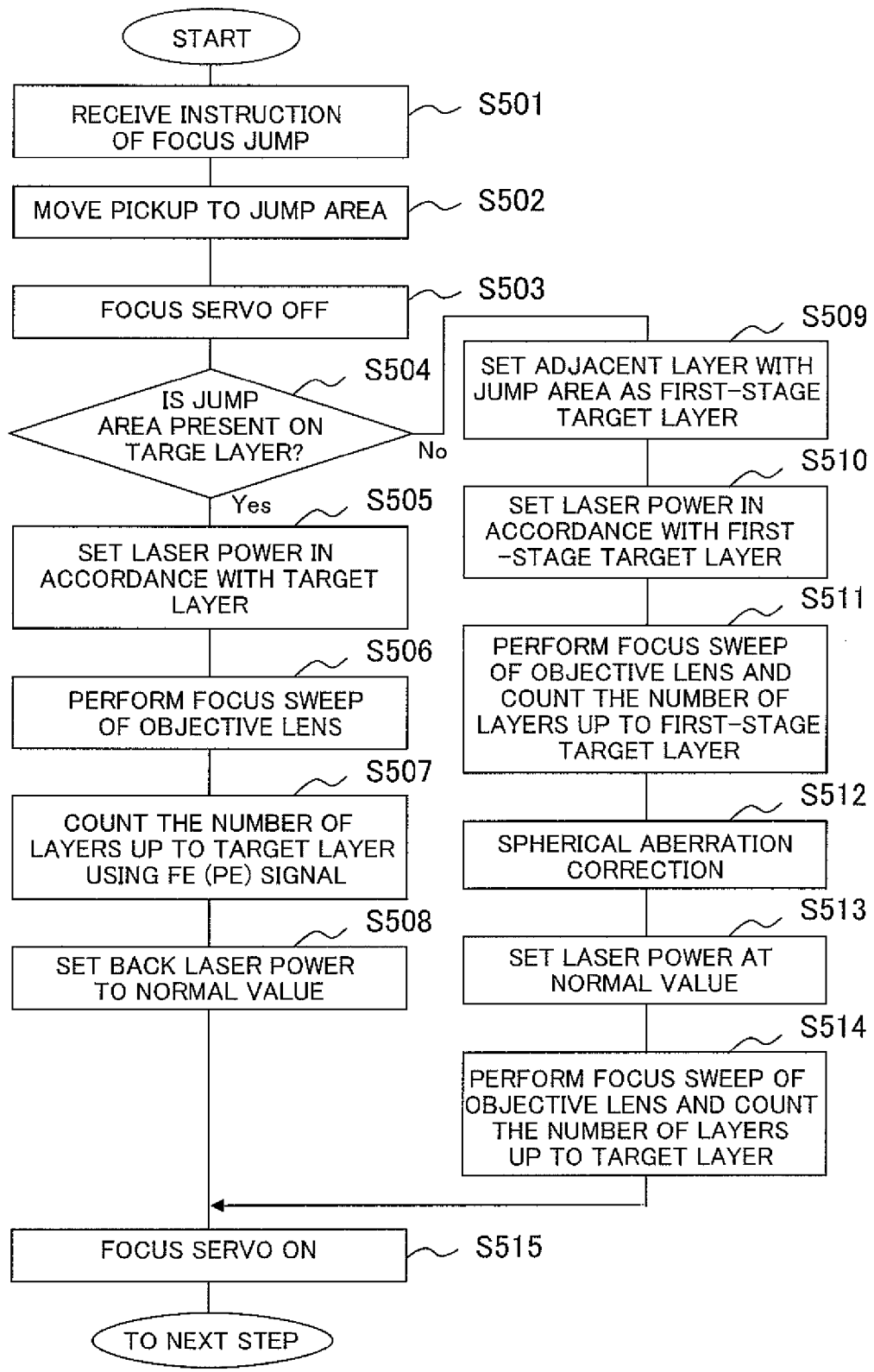
FIG. 14 is a flowchart for showing procedures of a focus jump according to a fifth embodiment.

FIG. 14 is a flowchart showing procedures of a focus jump according to the fifth embodiment.

In S501, an instruction of a focus jump to another recording layer is received from the host apparatus.

In S502, the optical pickup is moved to the jump area 11 (or the area corresponding to the jump area in the radial direction).

In S503, the focus servo is turned off.

In S504, it is determined whether or not the jump area 11 is present on a target layer to which the focus is jumped. If the jump area 11 is present, the flow proceeds to S505 (Yes). If the jump area 11 is not present, the flow proceeds to S509 (No).

In S505 to S508, the laser power level is set in accordance with FIGS. 8A to 8C on the basis of a target layer to perform a focus jump, as similar to S104 to S107 of the first embodiment (FIG. 10).

In S509, since there is no jump area on the target layer, an adjacent layer having the jump area is set as a first-stage target layer. For example, when the target layer is L3 in FIG. 4B, an adjacent layer L2 or L4 having the jump area is set as a first-stage target layer.

In S510, the laser power level is set in accordance with FIGS. 8A to 8C on the basis of the first-stage target layer (the layer L2 or L4).

In S511, a focus sweep of the objective lens is performed in the direction towards the first-stage target layer (the layer L2 or L4), the number of times of intersecting with the recording layers is counted, and the focus sweep is stopped if determined that the focus reaches the first-stage target layer (the layer L2 or L4).

In S512, the spherical aberration correction of the objective lens is set at the target layer (the layer L3).

In S513, the laser power level is set at the normal value.

In S514, a focus sweep of the objective lens is performed in the direction towards the target layer (the layer L3), the number of times of intersecting with the recording layers is counted, and the focus sweep is stopped if determined that the focus reaches the target layer (the layer L3).

In S515, the focus servo is turned on, and the focus jump operation is completed.

According to the fifth embodiment, in the case where no jump area is provided on a target layer, a jump operation is performed at multi-stages, and a first jump to an adjacent layer having the jump area is performed while changing the power level, so that the accuracy of the focus jump to the target layer can be improved as compared to the fourth embodiment.

Sixth Embodiment

A sixth embodiment is a method in which in the case where a jump fails at the normal power level in any one of the type A and type B, the focus jump is retried by any jump method of the embodiments.

Figure 15:
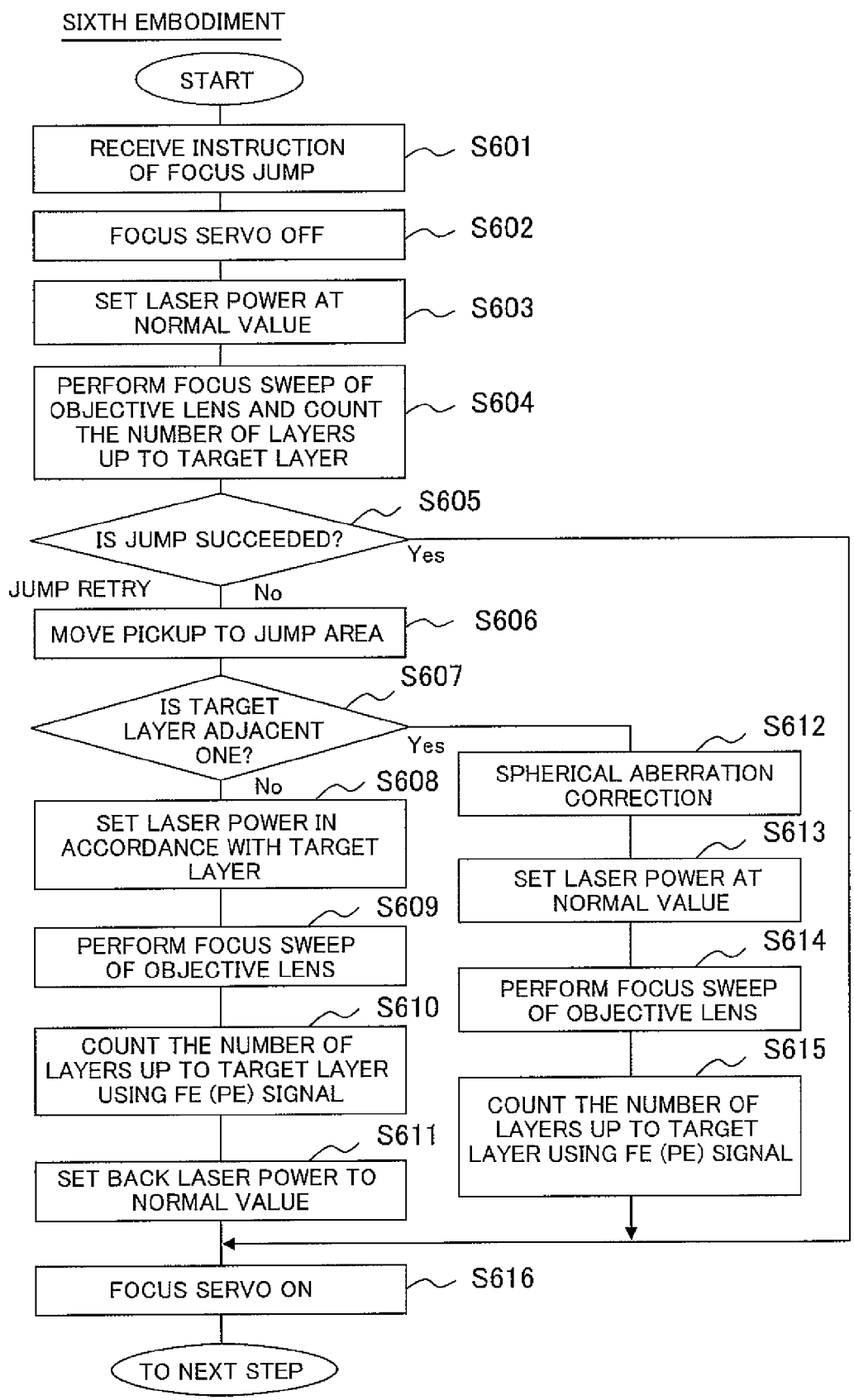
FIG. 15 is a flowchart for showing procedures of a focus jump according to a sixth embodiment.

FIG. 15 is a flowchart showing procedures of a focus jump according to the sixth embodiment. This example shows a case in which when a jump fails, the jump is retied by the method of the second embodiment.

In S601, an instruction of a focus jump to another recording layer is received from the host apparatus.

In S602, the focus servo is turned off.

In S603, the laser power level is set at the normal value. It should be noted that if the current power value is the normal value, the laser power level does not need not to be changed.

In S604, a focus sweep of the objective lens is performed at the current position (data area) in the direction towards the target layer, the number of times of intersecting with the recording layers is counted, and the focus sweep is stopped if determined that the focus reaches the target layer.

In S605, the layer number of the current recording layer is confirmed to determine whether or not the jump succeeds (whether or not the jumped position corresponds to the target layer). If the jump succeeds, the flow proceeds to S616 (Yes). If the jump fails (the jumped position is different from the target layer), the flow proceeds to S606 (No).

In S606, the optical pickup is moved to the jump area 11.

Steps after S607 are for jump retry, and thus the same processes as those after S204 in the second embodiment are performed. Specifically, it is determined whether or not the target layer is the adjacent layer. If the target layer is not the adjacent layer, the flow proceeds to S608 (No). If the target layer is the adjacent layer, the flow proceeds to S612 (Yes).

In S608 to S611, the laser power level is set on the basis of a target layer to perform a focus jump, as similar to S104 to S107 of the first embodiment (FIG. 10).

In S612 to S615, the spherical aberration correction of the objective lens is set at the adjacent layer that is the target layer, and a focus jump is performed at the normal laser power level, as similar to S209 to S212 of the second embodiment (FIG. 11).

In S616, the focus servo is turned on, and the focus jump operation is completed.

In this example, when a jump fails, the jump is retried by the method of the second embodiment. However, it is possible to retry the jump by any method of the first and the third to fifth embodiments.

According to the sixth embodiment, when a jump fails at the normal power level, the jump is retried by switching to any jump method of other embodiments, so that in the case where the probability of success of a jump at the normal power level is high, the focus jump can be further simplified by combining this.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A focus jump method for a multilayer optical disk having a plurality of recording layers, the optical disk having jump areas which are provided separately from data areas and at which a focus jump is performed, the method comprising:

moving an optical pickup for irradiating a laser light to the jump area;

setting and changing the laser power level of the optical pickup in accordance with a target layer to which the focus is jumped; and allowing a focus position to reach the target layer by counting the number of times of intersecting with the recording layers using a reflected light from the optical disk while performing a focus sweep of an objective lens in the optical pickup;

wherein in the case where the jump area is not present on the target layer to which the focus is jumped, the laser power of the optical pickup is set at the predetermined normal power level.

2. A focus jump method for a multilayer optical disk having a plurality of recording layers, the optical disk having jump areas which are provided separately from data areas and at which a focus jump is performed, the method comprising:

moving an optical pickup for irradiating a laser light to the jump area;

setting and changing the laser power level of the optical pickup in accordance with a target layer to which the focus is jumped; and allowing a focus position to reach the target layer by counting the number of times of intersecting with the recording layers using a reflected light from the optical disk while performing a focus sweep of an objective lens in the optical pickup;

wherein in the case where the jump area is not present on the target layer to which the focus is jumped, a first focus jump to an adjacent layer having the jump area is performed by setting a laser power level in accordance with the adjacent layer, and a focus jump to the target layer is performed at the predetermined normal laser power level.

* * * * *